No. 612,370. Patented Oct. 11, 1898.
T. B. WALL.
NUT LOCK.
(Application filed Oct. 12, 1897.)
(No Model.)
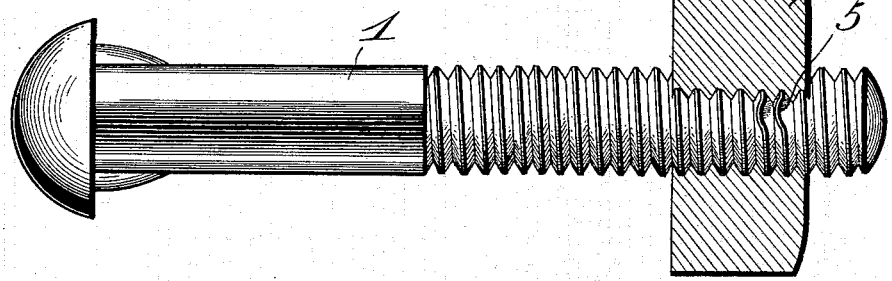
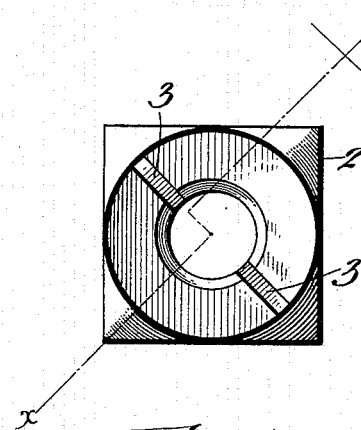
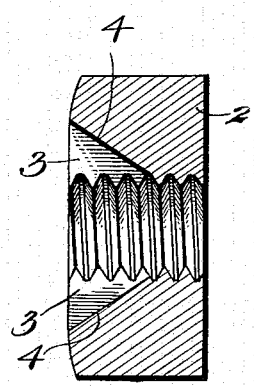
Witnesses  Thomas B. Wall, Inventor.
By his Attorneys.

UNITED STATES PATENT OFFICE.

THOMAS B. WALL, OF TUNKHANNOCK, PENNSYLVANIA, ASSIGNOR OF ONE-HALF TO FRANK L. SITTSER, OF SAME PLACE.

NUT-LOCK.

SPECIFICATION forming part of Letters Patent No. 612,370, dated October 11, 1898.

Application filed October 12, 1897. Serial No. 655,002. (No model.)

*To all whom it may concern:*

Be it known that I, THOMAS B. WALL, a citizen of the United States, residing at Tunkhannock, in the county of Wyoming and State of Pennsylvania, have invented a new and useful Nut-and-Bolt Lock, of which the following is a specification.

This invention relates to nut-locks; and the object thereof is to so construct a nut as to permit of a suitable instrument having access to the threads of a bolt in a longitudinal direction to force or press one or more of the threads of said bolt out of its proper position, so as not to fit the threads of the nut, whereby the nut is prevented from being accidentally displaced, but can be removed by the application of force.

To this end the invention consists in providing one or more inclined notches or recesses in the outer face of a nut and opening into the threaded bore thereof and adapted to receive an instrument in a plane approximately lengthwise of the bolt, whereby a portion of one or more of the threads of the bolt may be pressed out of its normal position. This object of the present invention will be hereinafter more fully described, shown in the accompanying drawings, and particularly pointed out in the claims.

In the drawings, Figure 1 is a side elevation of a bolt having my improved nut applied thereto and partly broken away to show the engagement of the threads of the nut with the bent or deflected portion of the threads of the bolt. Fig. 2 is a plan view of the outer face of the nut. Fig. 3 is a sectional view of the nut, taken through the notches or recesses.

Like numerals of reference designate corresponding parts in all the figures of the drawings.

Referring to the drawings, 1 designates a bolt, of common or ordinary form, having my improved nut 2 applied thereto in locked position. The nut is of the usual form, but is provided with a pair of notches or recesses 3 in its outer face, extending a suitable distance within the nut. There may be as many recesses as desired; but two are preferred and are arranged at diametrically opposite sides of the bore of the nut. Each of the recesses opens for its full depth into the bore of the nut, intersecting the threads in a longitudinal direction, while its outer wall 4 is inclined downward from the outer upper end of the recess to the lower end thereof, as shown in Fig. 3. It will be noted that the recesses do not extend to the outer edge of the nut, but only a part way thereto, whereby the wall 4 is provided to confine the instrument to be inserted in the recesses against the threads of the bolt.

In applying the invention to use the nut is screwed upon the bolt as far as desired and then a pointed instrument is inserted in the recesses, and by reason of the inclined wall of the recess the point of the instrument is directed against one of the threads, and then by hitting the instrument a portion of the thread 5 is bent or deflected out of its proper direction. The instrument is then withdrawn. Any movement of the nut in either direction will bind the threads of the nut against the bent portion of the thread of the bolt, and thus prevent the accidental displacement of the nut. However, the nut may be removed by force, as the bent portion of the bolt-thread will be returned to its normal position and capable of use again. Thus the threads of the nut are not affected in any manner, and the threads of the bolt are always returned to their normal position.

I am aware that nuts have been provided with recesses extending radially into the bore of the nut for the reception of an instrument which cuts across the threads and upsets the same to engage the walls of the recess. This is an essentially different operation from the present invention, which relies upon the threads being deflected to one side to bind in the threads of the nut. The recesses are solely for the purpose of giving the instrument access to the threads and play no part in the locking of the nut, as is the case with other inventions.

Having thus described the invention, what is claimed is—

1. A nut-lock comprising a nut having one or more inclined recesses formed in one face thereof, said recesses opening for their entire depth into the bore of the nut and extending in width only part way across the face of the nut, the recesses thus formed being adapted to receive an instrument in an approximately longitudinal direction with respect to the bolt to bend or deflect some of the threads of the bolt, substantially as and for the purpose set forth.

2. A nut-lock comprising a nut having one or more inclined recesses formed in one face thereof, said recesses opening for their entire depth into the bore of the nut and extending in width only part way across the face of the nut, and having an end wall inclined downward from the upper outer end of the recess to the lower end of the opening into the bore of the nut, substantially as shown and described and for the purpose set forth.

THOMAS B. WALL.

Witnesses:
FRANK L. SITTSER,
HENRY HARDING.